(12) United States Patent
Lafleur

(10) Patent No.: US 12,270,278 B2
(45) Date of Patent: Apr. 8, 2025

(54) HIGH PRESSURE ELECTRICAL CONNECTION

(71) Applicant: Halliburton Energy Services, Inc., Houston, TX (US)

(72) Inventor: Louis Francis Lafleur, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 18/137,225

(22) Filed: Apr. 20, 2023

(65) Prior Publication Data

US 2024/0352825 A1    Oct. 24, 2024

(51) Int. Cl.
| | |
|---|---|
| *E21B 34/06* | (2006.01) |
| *F16K 31/06* | (2006.01) |
| *H01R 13/52* | (2006.01) |
| *H01R 13/523* | (2006.01) |

(52) U.S. Cl.
CPC ............ *E21B 34/066* (2013.01); *F16K 31/06* (2013.01); *H01R 13/5219* (2013.01); *H01R 13/523* (2013.01)

(58) Field of Classification Search
CPC ...... E21B 34/066; E21B 17/028; E21B 17/00; E21B 17/003; E21B 17/0285; E21B 17/03; E21B 17/04; E21B 47/01; E21B 47/013; E21B 47/017; E21B 47/0175; E21B 34/06; E21B 34/063; E21B 34/08; E21B 34/085; E21B 34/10
See application file for complete search history.

(56) References Cited

U.S. PATENT DOCUMENTS

| | | | | |
|---|---|---|---|---|
| 2,725,283 A | * | 11/1955 | Mounce | G01V 9/005 422/50 |
| 3,633,624 A | | 1/1972 | Leibfritz et al. | |
| 4,667,736 A | * | 5/1987 | Rumbaugh | E21B 23/03 251/30.01 |
| 4,683,944 A | * | 8/1987 | Curlett | E21B 21/12 175/215 |
| 4,734,893 A | * | 3/1988 | Claycomb | E21B 47/24 175/40 |
| 4,787,446 A | | 11/1988 | Howell et al. | |
| 6,161,618 A | | 12/2000 | Parks et al. | |
| 2002/0129945 A1 | * | 9/2002 | Brewer | E21B 47/017 166/242.6 |

(Continued)

FOREIGN PATENT DOCUMENTS

WO    2009023195 A1    2/2009

OTHER PUBLICATIONS

International Search Report & Written Opinion; PCT Application No. PCT/US2023/019365; mailed Jan. 17, 2024.

*Primary Examiner* — David Carroll
(74) *Attorney, Agent, or Firm* — NOVAK DRUCE CARROLL LLP

(57) ABSTRACT

Systems and methods for operating an electrical actuator while submerged are disclosed. The actuator has a housing with a first fitting sealingly coupled to the external surface. The actuator is attached to a manifold that has an internal electrical passage coupled to a second external fitting. A connection assembly is sealingly coupled between the first and second fittings, thereby providing a dry open pathway from the interior of the housing to the internal electrical passage.

8 Claims, 4 Drawing Sheets

(56) References Cited

U.S. PATENT DOCUMENTS

| | | | |
|---|---|---|---|
| 2012/0268074 A1* | 10/2012 | Cooley | H01M 10/39 |
| | | | 320/167 |
| 2014/0102714 A1* | 4/2014 | Villareal | E21B 49/10 |
| | | | 175/320 |
| 2014/0265580 A1* | 9/2014 | Cooley | H02K 7/1853 |
| | | | 290/1 A |
| 2015/0107824 A1* | 4/2015 | Signorelli | E21B 41/0085 |
| | | | 166/244.1 |
| 2018/0066513 A1* | 3/2018 | Sugiura | E21B 7/06 |
| 2019/0323307 A1* | 10/2019 | George | E21B 47/12 |
| 2020/0299941 A1 | 9/2020 | Veros et al. | |
| 2022/0010630 A1* | 1/2022 | Musso | E21B 47/017 |
| 2022/0349265 A1* | 11/2022 | Esparza | E21B 47/13 |

\* cited by examiner

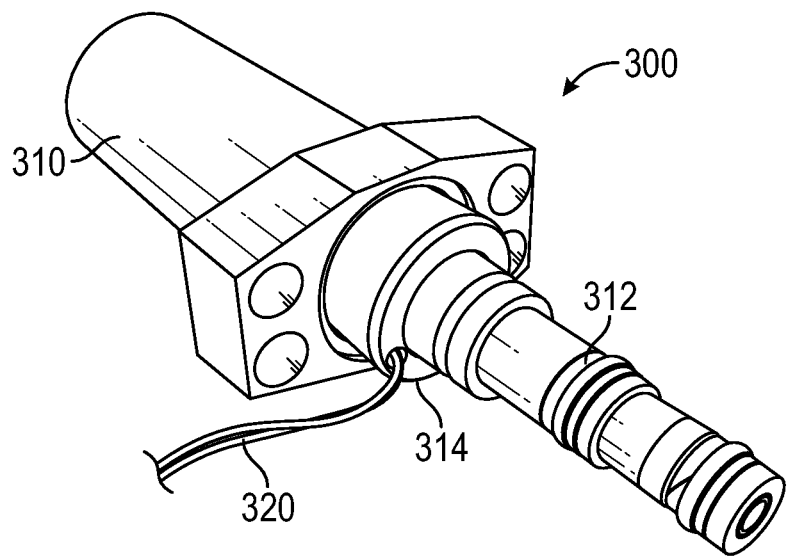
FIG. 3
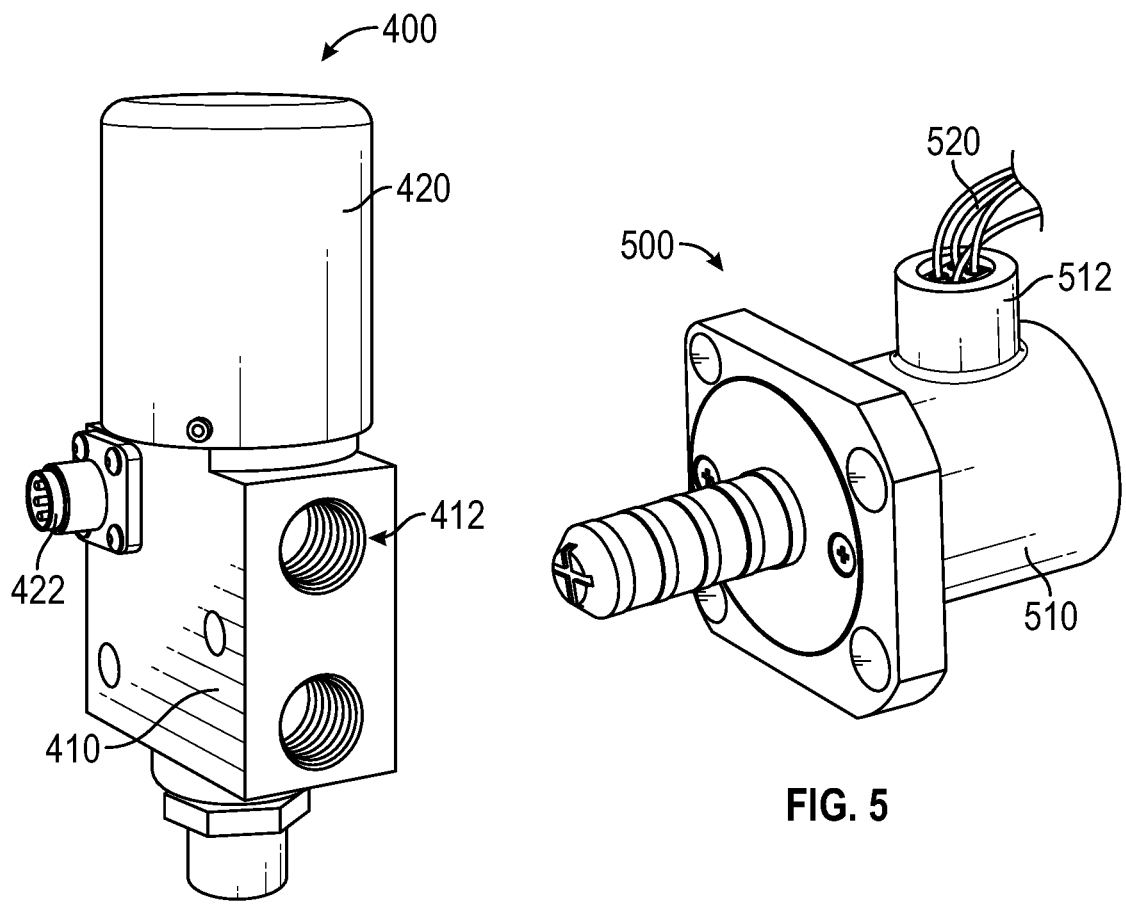
FIG. 4
FIG. 5

HIGH PRESSURE ELECTRICAL CONNECTION

TECHNICAL FIELD

The present technology pertains to electrical components used as part of downhole equipment during well completion.

BACKGROUND

Drilling a well for oil or gas production has several stages, including a completion stage wherein various types of equipment are lowered into the wellbore to assess the wellbore and the surrounding formations. This equipment often includes fluid control devices, for example a Solenoid Operated Valve (SOV), that are integrated into the tool prior to being lowered into the wellbore. The wellbore may contain a liquid at a high temperature and/or a high pressure. Intrusion of the liquid into the assembled tool, particularly when the liquid contacts electrical circuits, is a persistent problem.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 3-5 illustrate conventional SOVs, in accordance with various aspects of the subject technology.

DETAILED DESCRIPTION

Figure 1:
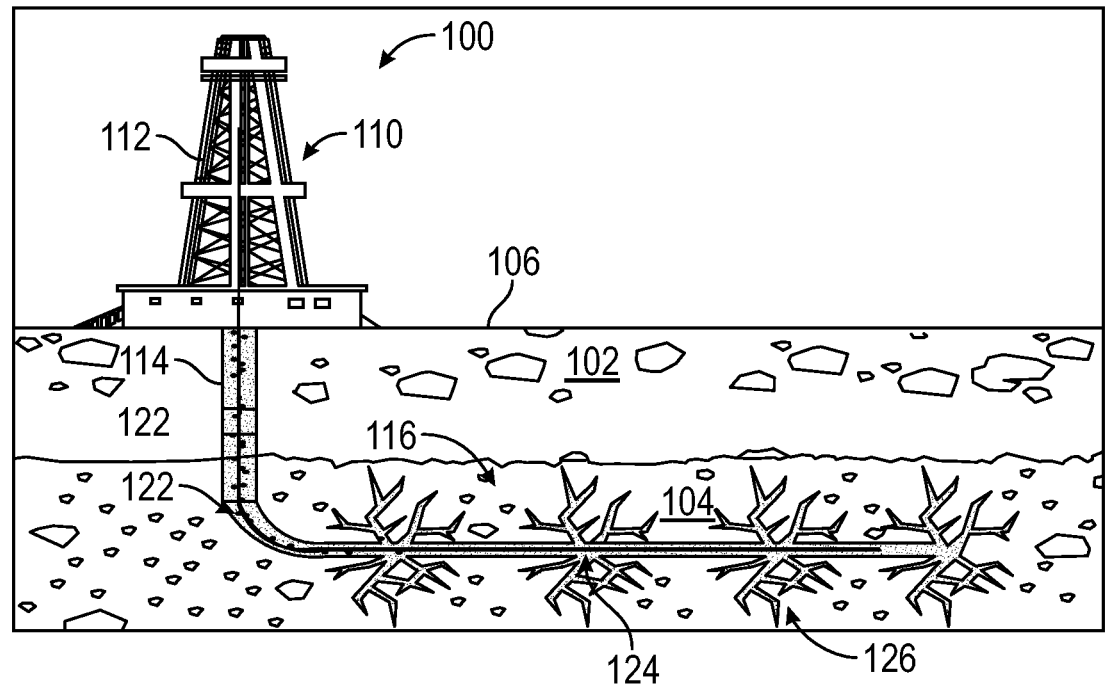
FIG. 1 is a schematic view of an example wellbore operating environment, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Operation of an electrical device while submerged in a fluid is challenging, and the magnitude of the challenge increases when the fluid is corrosive, at high pressure, and/or at a high temperature. External wires are particularly prone to problems as the fluid may penetrate the insulation at any point along the wire and then flow along the metal strands or flow between the insulation and the housing of the submerged device. Electrical connections through a housing are often sealed, or "potted," with an epoxy or similar sealant but these have limits on the type of fluid and operating temperature. Another approach, often used in downhole equipment, is to run the electrical wires through internal channels drilled in the primary tool. The cross-drilled passages inherently have sharp edges at the junction of passages, which pose a risk of cutting or shorting the electrical wires during installation or from vibration while in operation. The electrical passages often communicate with fluid passages within the primary tool, which presents an additional risk that fluid can leak from the fluid passages into the electrical passages and create a short in the electrical circuits.

The disclosed technology addresses the foregoing challenges by running all electrical wires to the submerged device through a high-pressure external conduit capable of excluding the hot, high-pressure, corrosive fluid. The conduit and fittings provide a smooth channel for the electrical wires, thereby avoiding sharp edges like those in cross-drilled passages. In certain embodiments, the conduit connects to electrical passages in the primary tool that are isolated from the internal fluid passages, thereby avoiding the risk of an internal leak damaging the electrical circuits.

FIG. 1 illustrates a schematic view of an example wellbore operating environment. As depicted in FIG. 1, the operating environment 100 includes a wellbore 114 that penetrates a formation 102 for the purpose of recovering hydrocarbons, storing hydrocarbons, injecting of water or carbon dioxide, or the like in formation 104. As depicted in FIG. 1, formation 102,104 are subterranean formations, although it is noted that formations 102,104 may be a subsea formation. In certain locations, there are a plurality of underground formations 102, 104. The wellbore 114 may extend substantially vertically away from the Earth's surface 106 over a vertical wellbore portion, or may deviate at any angle from the Earth's surface 106 over a deviated or horizontal wellbore portion 116. In alternative operating environments, portions or substantially all of the wellbore 114 may be vertical, deviated, horizontal, and/or curved. The wellbore 114 may be drilled into the formations 102, 104 using any suitable drilling technique. As shown, a drilling or servicing rig 110 disposed at the surface 106 (which may be the surface of the Earth, a seafloor surface, or a sea surface) comprises a derrick 112 from which a tubular string 120 (e.g., a drill string, a tool string, a segmented tubing string, a jointed tubing string, or any other suitable conveyance, or combinations thereof) is positioned within or partially within the wellbore 114. The tubular string 120 may include two or more concentrically positioned strings of pipe or tubing (e.g., a first work string may be positioned within a second work string). The drilling or servicing rig 110 may be conventional and may include a motor driven winch and other associated equipment for lowering the tubular string into the wellbore 114. Alternatively, a mobile workover rig, a wellbore servicing unit (e.g., coiled tubing units), or the like may be used to lower the work string into the wellbore 114. In such an environment, the tubular string 120 may be utilized in drilling, stimulating, completing, or otherwise servicing the wellbore, or combinations thereof. A drilling or servicing rig 106 may also comprise other equipment, e.g., as disclosed in FIG. 6.

While FIG. 1 depicts a stationary drilling rig 106, one of ordinary skill in the art will readily appreciate that mobile workover rigs, wellbore servicing units (such as coiled tubing units), and the like may be employed. In the context of subsea environments and/or subsea formations, one of ordinary skill in the art will appreciate that conventional fixed platforms, vertically moored platforms, spar platforms, semi-submersible platforms, floating production facilities, and sub-sea completion facilities and the like may be employed. It is noted that while the figures or portions thereof may exemplify horizontal or vertical wellbores, the principles of the presently disclosed apparatuses, methods, and systems, may be similarly applicable to horizontal wellbore configurations, conventional vertical wellbore configurations, deviated wellbore configurations, and any combinations thereof. The horizontal, deviated, or vertical nature of any figure is not to be construed as limiting the wellbore to any particular configuration or formation.

In certain types of operations, the wellbore 114 includes a lateral section 116. In certain types of operations, the wellbore 114 has one or more perforations 124 and a fluid 122 is forced down the tubular string 120 and out through perforations 124 to create fractures 126 in the formation 104.

Wellbores 114, by design and intent, tend to be filled with an ambient fluid, e.g., one or more of oil, water, natural gas, and other liquids and gases. The ambient fluid will be under pressure, sometimes referred to as bottomhole pressure or BHP, that is determined in part by the depth of the wellbore 114 at that point. Under certain conditions the ambient pressure in the wellbore 114 is up to 500 psi. Under certain conditions the ambient pressure in the wellbore 114 is up to 5000 psi. Under certain conditions the ambient pressure in the wellbore 114 is up to 10,000 psi, 20,000 psi, 30,000 psi, or more.

In certain embodiments, the ambient fluid is at an elevated temperature that is determined in part by the depth of the wellbore 114. Under certain conditions, the ambient temperature of the fluid in the wellbore 114 is up to 85 degrees Celsius (C), up to 150 C, or up to 200 C. In certain embodiments, e.g., a subsea well, the ambient fluid is at a reduced temperature that is determined in part by the local environment, e.g., ocean water. Under certain conditions, the ambient temperature of the fluid in the wellbore 114 is as low as 4 degrees Celsius.

Figure 2:
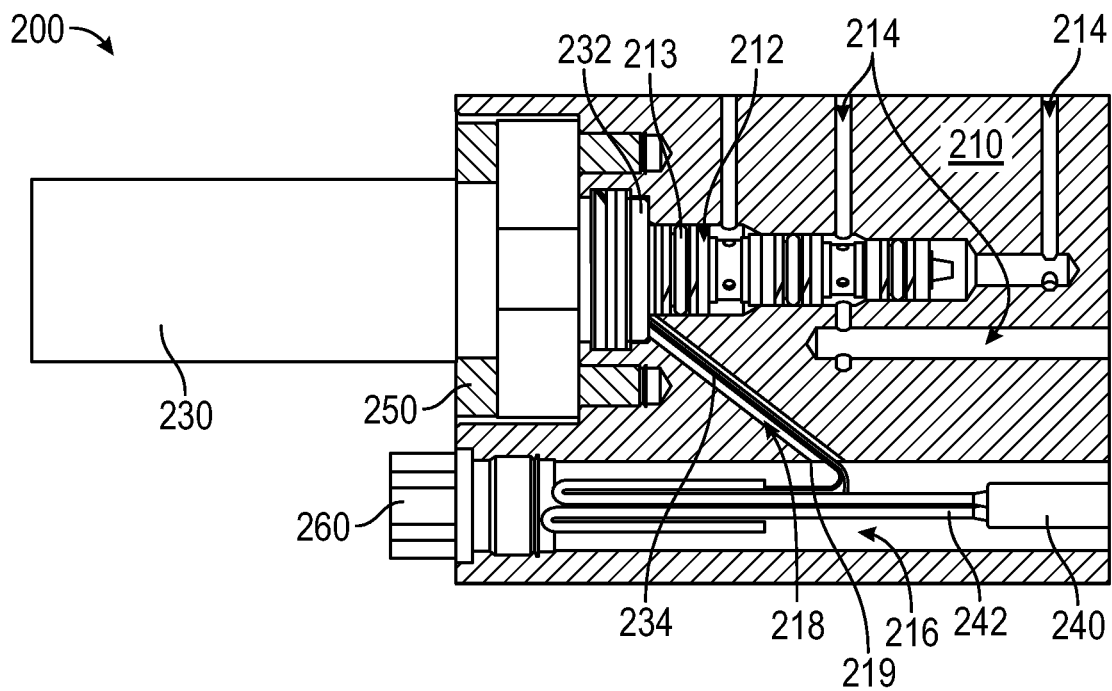
FIG. 2 illustrates a conventional downhole tool that has a SOV attached to a tool manifold.

FIG. 2 illustrates a conventional downhole tool 200 that has a SOV 230 attached to a tool manifold 210, in accordance with various aspects of the subject technology. The manifold 210 has a stepped recess 212 that is configured to accept the control piston 232. Fluid passages 214 are drilled through the body of manifold 210 to connect to portions of the recess 212. The SOV 230 is attached to the manifold 210 by bolts 250.

The control wires 234 of SOV 230 emerge through a port of the control piston 232 and pass through electrical passage 218 within the manifold 210. The SOV wires 234 are connected to wires 242 of a control cable 240 within an electrical passage 216. The wires 234 are at risk of being cut or damaged by the sharp edge 219 where the electrical passage 218 meets the electrical passage 216. A sealing device 260, e.g., a weld cap or a threaded plug, is installed after the wires 234 are connected to wires 242.

Given the need to locate the wires 234 within the manifold, certain risks are inherent. In this example, fluid from the recess 212 may leak past o-ring 213 and enter the electrical passage 218 and subsequently reach passage 216. As the connections of the wires 234, 242 are not sealed, this fluid may create a short from the wires to each other or to the manifold.

FIG. 3 illustrates a conventional SOV 300 wherein the electrical wires 320 emerge from the body 310 through a port 314 in a face of the housing adjacent to the piston 312. This face will be exposed to the fluid being controlled by the SOV and the wires 320 will run through an internal passage, as shown in FIG. 2.

FIG. 4 illustrates a conventional integrated tool 400 with a manifold 410 and a SOV 420. In this example, fluid enters the manifold through one of the ports 412. The electrical control signals are provided to the SOV 420 through a conventional electrical connector 422, sometimes referred to as a "bulkhead connector," that does not provide a fluid seal. Certain types of bulkhead connectors provide a fluid seal around the connecting pins but the external pins of the connector 422 and the connectors of the mating cable (not shown in FIG. 4) remain exposed to ambient fluid and subject to shorting.

FIG. 5 depicts another conventional SOV 500 where the control wires 520 emerge from the housing 510 through a port 512 that is exposed to the external environment. The wire 520 are individually potted to the port 512 and provide a degree of sealing around the individual wires, although potting materials typically have temperature and pressure limits that are lower than the downhole environment.

Figure 6:
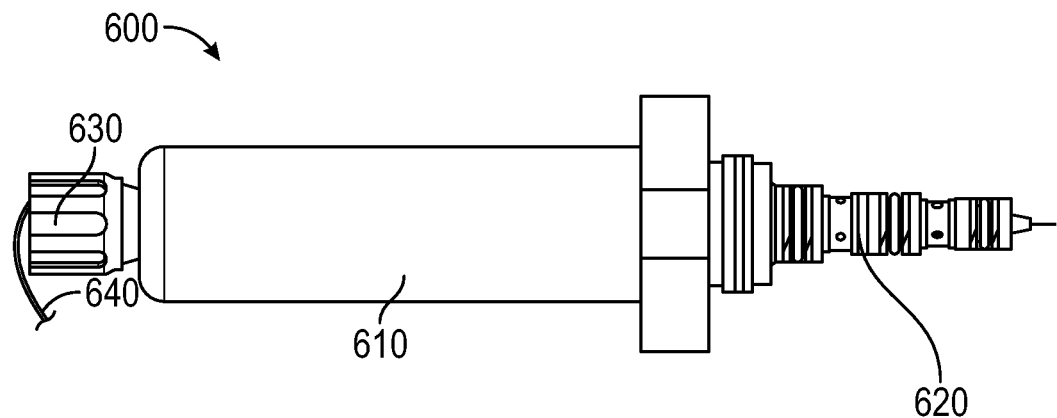
FIGS. 6-8 illustrate an example SOV and an example tool manifold, in accordance with various aspects of the subject technology.
Figure 7:
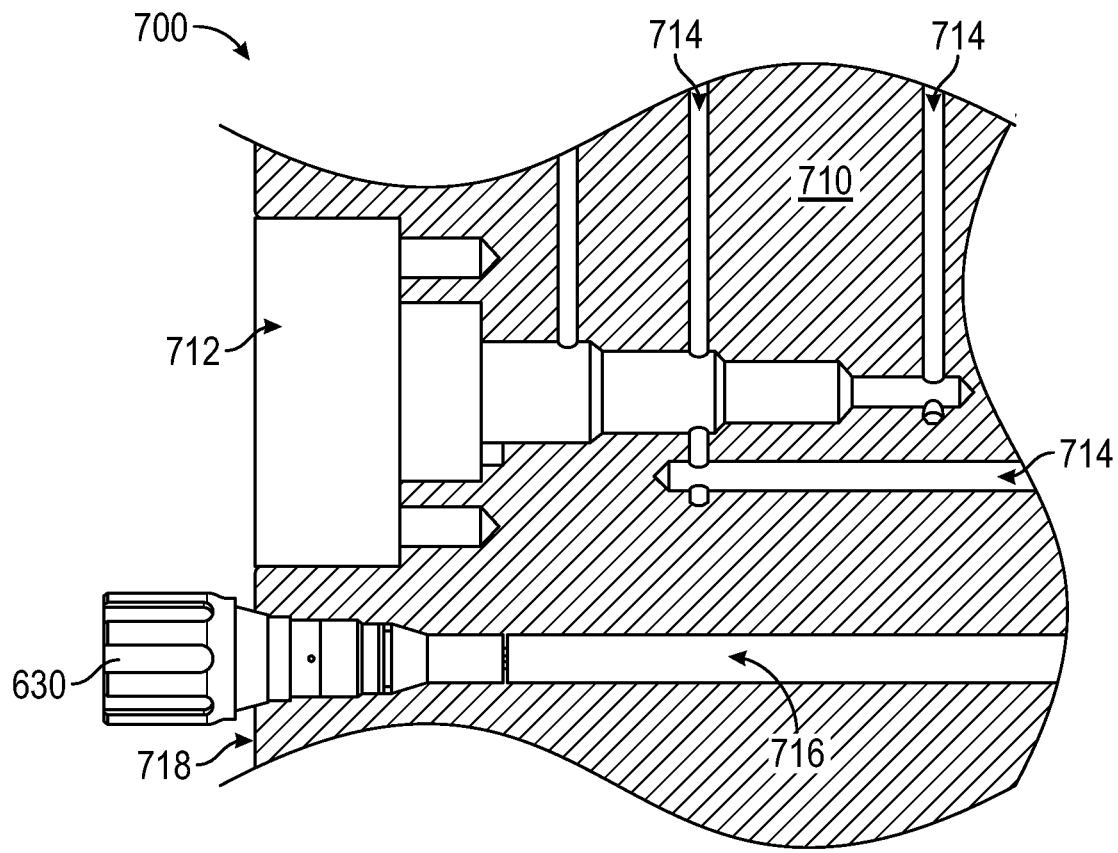
Figure 8:
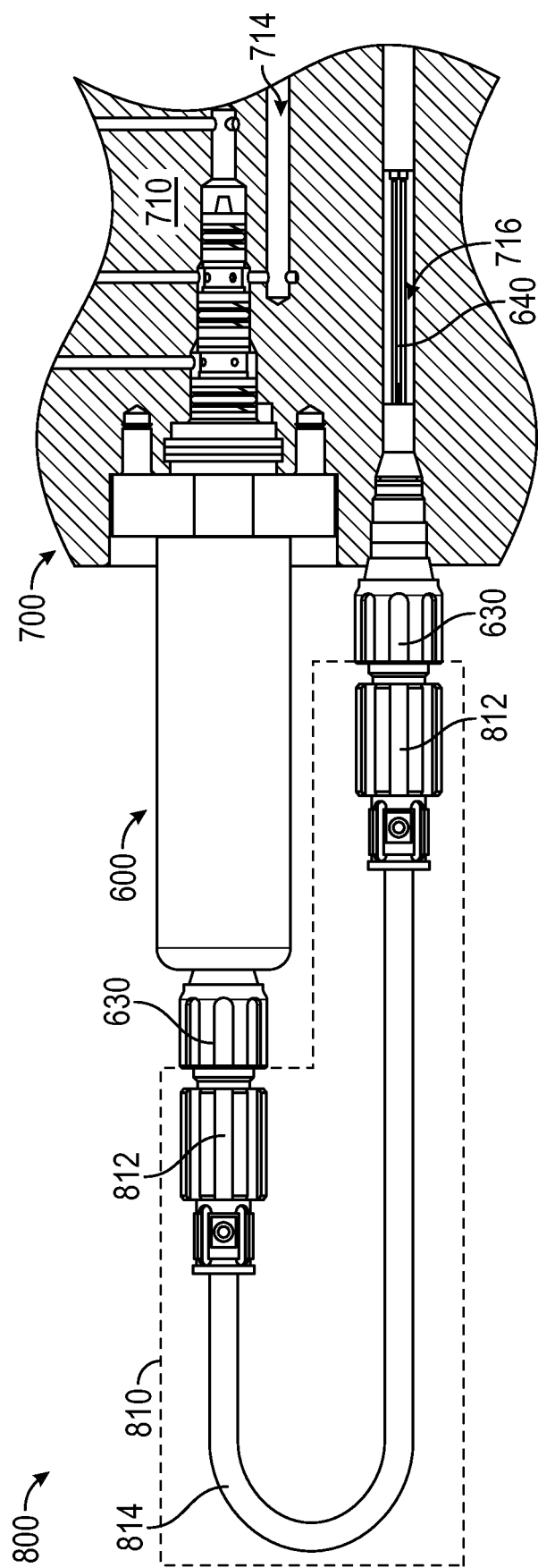

FIGS. 6-8 illustrate an example SOV and an example tool manifold, in accordance with various aspects of the subject technology.

FIG. 6 depicts an exemplary SOV 600 having a housing 610 and a movable control piston 620. The control wires 640 emerge from an interior of the housing 610, in this example, through a fitting 630 that is sealingly coupled to an exterior of the housing 610, wherein the term "exterior" is used herein to indicate a surface that is exposed to an external ambient environment, e.g., a fluid in which the SOV 600 is submerged, when the SOV 600 is integrated into a tool as shown in FIG. 8. In certain embodiments, the exterior surface of the housing 610 includes portions of the flange that remain exposed to the ambient environment after the SOV 600 is mated with the manifold 700. In certain embodiments, the fittings 630 is located on a side of housing 610 or on the flange. As used herein, the phrase "sealingly coupled" means that the joint between the coupled components forms a passage between the coupled components while preventing passage of a fluid between an interior and an exterior of the coupled structure. A sealingly coupled joint between two components may be provided by any method known to those of skill in the art, e.g., welding or bonding or a threaded fitting or compression of a soft-metal ring, and may comprise a sealant or adhesive. In certain embodiments, a sealingly coupled pair of components may be separated and then recoupled with or without replacement of an item, e.g., a soft-metal ring. In certain embodiments, a sealingly coupled pair of components are permanently joined, e.g., cannot be separated without cutting or damage to one or both components.

In certain embodiments, the concepts described herein are applied to electrically operated actuators, of which an SOV is an example, that are integrated into a tool. Actuators may control one or more of electric, magnetic, pneumatic, vacuum, and hydraulic components.

FIG. 7 depicts a portion of an exemplary manifold 700 in which fluid passages 714 are drilled in a body 710. These passages 714 include a recess 712 formed in external face 718 of the body 710. Fluid passages may connect to the recess 712 and/or to each other. In certain embodiments, an electrical passage 716 is formed in the body 712. The electrical passage 716 is isolated from fluid passages 714 and recess 712. As used herein, the term "isolated" means that there is no possible internal path of fluid flow, e.g., even if a seal fails or fluid leaks past the seal, from fluid passages 714 and/or recess 712 into the electrical passage 716. In certain embodiments, a fitting 630 is sealingly coupled to passage 716 at the external face 718.

FIG. 8 depicts an integrated tool 800 wherein SOV 600 has been mated to manifold 700. The face 718 will be exposed to the ambient environment, e.g., the hot, high-pressure fluid in the wellbore, when the tool 800 is disposed downhole. A connection assembly 810 has been installed between the fitting 630 of the SOV 600 and the fitting 630 of the manifold 700. The connection assembly 810 comprises a tube 814 and two couplers 812. The connection assembly 810 is sealingly coupled between the fittings 630, thereby providing a dry open pathway from the interior of the housing 610 through the tube 814 to the internal electrical passage 716. The term "dry," as used within this disclosure, means that no fluid or moisture is present within the stated volume or interior of the identified component. The term "open," as used within this disclosure, means that there is sufficient unobstructed space along the entirety of the pathway to pass a solid continuous component, e.g., several insulated electrical wires, along the pathway.

As used herein, the term "tube" includes hollow structures that comprise one or more of a metal, a ceramic, and a plastic. A tube may be flexible, e.g., a corrugated metal pipe, or rigid and comprises one or more layers that are solid or woven structures. In certain embodiments, the path of the wires 640 is entirely isolated from fluid passages of the tool 800, including the internal fluid passages 714 of the manifold 700.

Each coupler 812 is configured to sealingly couple one of the ends of tube 814 to one of the fittings 630. The fittings 630 and couplers 812 are further configured to prevent passage of a high-pressure fluid between an interior and an exterior of the coupled structures. As used herein, the phrase "high pressure" may refer to an absolute or gauge pressure at a point or in an environment or may refer to a pressure differential across a joint or interface. As downhole tools are assembled at the surface, air-filled internal passages are typically at "atmospheric" pressure and therefore the gauge differential pressure across the coupled joints is equal to the absolute gauge pressure of fluid outside the downhole tool.

The tube 814 is selected to have a capability to withstand a high external pressure without collapse or other failure, optionally including a safety factor in this evaluation. Likewise, the fittings 630 and couplers 812 are selected such that a coupled pair can withstand a high external pressure without leakage. In certain embodiments, one or more of the tube 814, the fittings 630, and the couplers 812 are selected from commercial components intended for use in high-pressure hydraulic systems, i.e., designed for use with a high-pressure fluid inside the respective components, which is the reverse of the usage disclosed herein. In certain embodiments, a coupler 814 is removably coupled to the respective fitting 630, i.e., the two components may be disconnected without damage.

In addition to eliminating the risks associated with running wires through cross-drilled passages, the disclosed system also provides an easier method of assembly as the SOV 600 can be first installed into recess 712 without risk to the wires 640, then the wires 640 can be run through the connection assembly 810 and passage 716. In certain embodiments, the coupled system 800 comprises additional features (not shown in FIG. 8) that provide the capability to pressure test the integrated system, including the mated pairs of couplers 814 and fittings 630, to verify the leak-proof performance of the electrical passages before use.

While the example of FIG. 8 depicts the connection assembly 810 routing wires 640 from the SOV 600 to an electrical passage 716 within manifold 700, a connection assembly 810 may alternately route the wires 640 to another downhole component, e.g., a controller (not shown in FIG. 8), a fitting 630 on a support structure, e.g., drillstring 120 of FIG. 1, or a surface system (not shown in FIG. 1 or 8).

In summary, the disclosed system provides a simple and reliable connection of an electrical device to a tool intended for operation submerged in a high-pressure fluid, e.g., at the bottom of a wellbore. The disclosed design eliminates risks associated with certain conventional methods of running wires from a device through the integrated tool. The disclosed system uses conventional components designed for other applications and satisfactory performance can be verified before use.

For clarity of explanation, in some instances the present technology may be presented as including individual functional blocks including functional blocks comprising devices, device components, steps or routines in a method embodied in software, or combinations of hardware and software.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:
(A1) A system for operation while submerged in an ambient fluid at an ambient pressure, comprising: an electrically operated actuator comprising: a housing having an interior and an external surface; and a first fitting disposed on the external surface and sealingly coupled to the housing; a manifold comprising: a body with an external face; an internal electrical passage formed within the body; and a second fitting disposed on the external face and sealingly coupled to the internal electrical passage; and a connection assembly sealingly coupled between the first and second fittings, thereby providing a dry open pathway from the interior of the housing through the tube to the internal electrical passage.

(A2) The system of A1, wherein the connection assembly comprises: a tube having two ends; and two couplers, each configured to sealingly couple one of the ends of the tube to one of the first and second fittings.

(A3) The system of A2, wherein the tube has a collapse pressure that is greater than the ambient pressure.

(A4) The system of A2, wherein the tube, the couplers, and the fittings are configured to prevent the ambient fluid from entering the pathway when the ambient pressure is up to 500 psi.

(A5) The system of A4, wherein the ambient pressure is up to 30,000 psi.

(A6) The system of A1, wherein the electrically operated actuator is a solenoid operated valve (SOV).

(A7) The system of A6, wherein: the SOV further comprises a movable actuator; the manifold further comprises: a recess formed in the external face and configured to accept the movable actuator of the SOV; and an internal fluid passage formed within the body; the SOV is coupled to the manifold with the movable actuator disposed in the recess; and the electrical passage is isolated from the recess and from the internal fluid passage.

(A8) The system of A7, wherein the external face of the manifold and the external surface of the housing of the SOV are configured for exposure to the ambient fluid.

(A9) The system of A1, further comprising electrical wires that pass from the interior of the housing of the SOV through the tube and into the electrical passage of the manifold.

(B1) A downhole assembly, comprising: a manifold, comprising: an internal fluid passage; and an internal electrical passage isolated from the internal fluid passage; a solenoid operated valve (SOV) coupled to the manifold and configured to control a flow of a fluid within the internal fluid passage; and a tube sealingly coupled between the SOV and the internal electrical passage, thereby providing a dry open pathway from an interior of the SOV through the tube to the internal electrical passage.

(C1) A method of assembling a tool for operation while submerged in an ambient fluid at an ambient pressure, comprising: coupling an electrically operated actuator to an external face of a manifold; guiding an electrical wire that emerges from a first fitting on an external surface of the electrically operated actuator through a connection assembly and into a second fitting that is disposed on the external face and coupled to an internal electrical passage of the manifold; sealingly coupling a first coupler of the connection assembly to the first fitting; and sealingly coupling a second coupler of the connection assembly to the second fitting, thereby providing a dry open pathway from and interior of the electrically operated actuator to the internal electrical passage and preventing the ambient fluid from entering the pathway when the ambient pressure is up to 500 psi when the couplers are mated to the respective fittings.

What is claimed is:
1. A downhole assembly, comprising:
a manifold, comprising:

an internal fluid passage;

an internal electrical passage that is isolated from the internal fluid passage;

an external face;

a recess formed in the external face and configured to accept a movable actuator of a solenoid operated valve (SOV);

the SOV coupled to the manifold and configured to control a flow of a fluid within the internal fluid passage wherein:

the SOV further comprises:

the movable actuator and a housing having an external surface;

wherein the SOV is coupled to the manifold with the movable actuator disposed in the recess and the electrical passage is isolated from the recess and from the internal fluid passage; and a tube sealingly coupled between the SOV and the internal electrical passage, thereby providing a dry open pathway from an interior of the SOV through the tube to the internal electrical passage.

2. The downhole assembly of claim 1, wherein:

a first fitting is sealingly coupled to the SOV;

a second fitting is sealingly coupled to the internal electrical passage of the manifold;

the tube has two ends; and the tube comprises two couplers, each configured to sealingly couple one of the ends of the tube to one of the first and second fittings.

3. The downhole assembly of claim 2, wherein the tube has a collapse pressure that is greater than the ambient pressure.

4. The downhole assembly of claim 2, wherein:

the downhole assembly is configured to be operated while submerged in an ambient fluid at an ambient pressure; and the tube, the couplers, and the fittings are configured to prevent the ambient fluid from entering the pathway when the ambient pressure is up to 500 psi.

5. The downhole assembly of claim 4, wherein the ambient pressure is up to 30,000 psi.

6. The downhole assembly of claim 2, wherein the tube, the couplers, and the fittings are configured to prevent the ambient fluid from entering the pathway when the ambient temperature is within the range of 4-200 degrees Celsius.

7. The downhole assembly of claim 1, wherein the external face of the manifold and the external surface of the housing of the SOV are configured for exposure to the ambient fluid.

8. The downhole assembly of claim 1, further comprising electrical wires that pass from the interior of the housing of the SOV through the tube and into the electrical passage of the manifold.

* * * * *